US010404516B2

(12) United States Patent
Li et al.

(10) Patent No.: US 10,404,516 B2
(45) Date of Patent: Sep. 3, 2019

(54) DATA DEMODULATION METHOD, USER EQUIPMENT, BASE STATION, AND SYSTEM

(71) Applicant: Huawei Technologies Co., Ltd., Shenzhen (CN)

(72) Inventors: Qiming Li, Beijing (CN); Jiadi Liu, Beijing (CN); Jing Han, Beijing (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/015,964

(22) Filed: Jun. 22, 2018

(65) Prior Publication Data

US 2018/0302260 A1 Oct. 18, 2018

Related U.S. Application Data

(63) Continuation of application No. 15/705,830, filed on Sep. 15, 2017, which is a continuation of application No. PCT/CN2015/086962, filed on Aug. 14, 2015.

(30) Foreign Application Priority Data

Mar. 17, 2015 (WO) ................ PCT/CN2015/074420

(51) Int. Cl.
*H04L 27/26* (2006.01)
*H04W 4/02* (2018.01)
(Continued)

(52) U.S. Cl.
CPC ........... *H04L 27/2655* (2013.01); *H04B 7/08* (2013.01); *H04L 25/02* (2013.01);
(Continued)

(58) Field of Classification Search
CPC ............. H04L 27/2655; H04L 27/2649; H04L 27/2657; H04L 27/2685; H04L 27/2695;
(Continued)

(56) References Cited

U.S. PATENT DOCUMENTS 6,671,002 B1 * 12/2003 Konishi ................ H03L 7/107
348/725
6,731,704 B1 5/2004 Kiyanagi
(Continued)

FOREIGN PATENT DOCUMENTS

CN 102111355 A 6/2011
CN 102571165 A 7/2012
(Continued)

OTHER PUBLICATIONS

Machine Translation and Abstract of Chinese Publication No. CN102111355, Jun. 29, 2011, 16 pages.
(Continued)

*Primary Examiner* — Magdi Elhag
(74) *Attorney, Agent, or Firm* — Conley Rose, P.C.

(57) ABSTRACT

A data demodulation method, apparatus, and system are presented. The method includes obtaining notification information indicating that user equipment (UE) is in a high-speed moving state; performing time-frequency synchronization processing on first downlink data according to the notification information to obtain second downlink data; and performing demodulation processing on the second downlink data to obtain third downlink data, where in the demodulation processing, inter-transmission time intervals (TTIs) filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation. The demodulation method is applicable to a high-speed scenario for improving a downlink data throughput of the UE.

14 Claims, 12 Drawing Sheets

(51) Int. Cl.
*H04B 7/08* (2006.01)
*H04W 88/02* (2009.01)
*H04L 25/02* (2006.01)
*H04L 27/00* (2006.01)
*H04W 84/00* (2009.01)

(52) U.S. Cl.
CPC ...... *H04L 25/0222* (2013.01); *H04L 27/2649* (2013.01); *H04L 27/2657* (2013.01); *H04L 27/2685* (2013.01); *H04L 27/2695* (2013.01); *H04W 4/027* (2013.01); *H04W 88/02* (2013.01); *H04L 2027/004* (2013.01); *H04L 2027/0026* (2013.01); *H04W 84/005* (2013.01)

(58) Field of Classification Search
CPC .... H04L 25/02; H04L 25/0222; H04W 4/027; H04W 88/02; H04B 7/08
See application file for complete search history.

(56) References Cited

U.S. PATENT DOCUMENTS

| | | | |
|---|---|---|---|
| 7,684,379 | B2 | 3/2010 | Kim et al. |
| 7,970,068 | B2 | 6/2011 | Arambepola et al. |
| 8,081,027 | B2 * | 12/2011 | Iida ............... H04L 27/0014 |
| | | | 329/304 |
| 8,149,905 | B1 | 4/2012 | Cheng et al. |
| 8,842,789 | B2 * | 9/2014 | Reial ............. H04L 25/0204 |
| | | | 375/350 |
| 10,027,525 | B2 * | 7/2018 | Li ..................... H04B 7/08 |
| 2004/0218702 | A1 | 11/2004 | Denk |
| 2005/0286666 | A1 | 12/2005 | Ryu |
| 2009/0323789 | A1 | 12/2009 | Ragab et al. |
| 2011/0216865 | A1 | 9/2011 | Qi et al. |
| 2011/0299572 | A1 | 12/2011 | Monsen et al. |
| 2013/0121188 | A1 | 5/2013 | Das et al. |
| 2014/0369448 | A1 | 12/2014 | Ogoro |
| 2015/0215142 | A1 | 7/2015 | Shibata |
| 2016/0080906 | A1 | 3/2016 | Wang et al. |
| 2016/0360537 | A1 * | 12/2016 | Palenius ............ H04W 48/08 |
| 2017/0041895 | A1 | 2/2017 | Gan et al. |

FOREIGN PATENT DOCUMENTS

| | | |
|---|---|---|
| CN | 102710270 A | 10/2012 |
| CN | 103269259 A | 8/2013 |
| CN | 104160644 A | 11/2014 |
| JP | 2007235305 A | 9/2007 |

OTHER PUBLICATIONS

Machine Translation and Abstract of Chinese Publication No. CN102571165, Jul. 11, 2012, 20 pages.
Machine Translation and Abstract of Chinese Publication No. CN102710270, Oct. 3, 2012, 15 pages.
Machine Translation and Abstract of Japanese Publication No. JP2007235305, Sep. 13, 2007, 13 pages.
Yi-Hsin, Y., et al., "A joint scheme of decision-directed channel estimation and Weighted-average phase error tracking for OFDM WLAN systems," XP10783396, The Asia-Pacific Conference on Circuits and Systems, vol. 2, Dec. 6-9, 2004, pp. 985-988.
Ericsson, "Correction to handling of parameters when entering CELL_DCH," 3GPP TSG-RAN WG2 Meeting #88, R2-144832, Current version: 12.3.0, Nov. 17-21, 2014, 21 pages.
Huawei, et al., "New channel mode for SFN deployment," 3GPP TSG-RAN WG4 Meeting #74, R4-150122, Feb. 9-13, 2015, 5 pages.
Foreign Communication From A Counterpart Application, European Application No. 15885155.0, Extended European Search Report dated Mar. 7, 2018, 11 pages.
Foreign Communication From A Counterpart Application, PCT Application No. PCT/CN2015/074420, English Translation of International Search Report dated Nov. 3, 2015, 2 pages.
Foreign Communication From A Counterpart Application, PCT Application No. PCT/CN2015/074420, English Translation of Written Opinion dated Nov. 3, 2015, 2 pages.
Foreign Communication From A Counterpart Application, PCT Application No. PCT/CN2015/086962, English Translation of International Search Report dated Dec. 23, 2015, 2 pages.
Foreign Communication From A Counterpart Application, PCT Application No. PCT/CN2015/086962, English Translation of Written Opinion dated Dec. 23, 2015, 5 pages.

* cited by examiner

DATA DEMODULATION METHOD, USER EQUIPMENT, BASE STATION, AND SYSTEM

CROSS-REFERENCE TO RELATED APPLICATIONS

This application is a continuation of U.S. patent application Ser. No. 15/705,830, filed on Sep. 15, 2017, which is a continuation of International Patent Application No. PCT/CN2015/086962, filed on Aug. 14, 2015. The International Patent Application claims priority to International Patent Application No. PCT/CN2015/074420, filed on Mar. 17, 2015. All of the afore-mentioned patent applications are hereby incorporated by reference in their entireties.

TECHNICAL FIELD

The present disclosure relates to the mobile communications field, and in particular, to a data demodulation method, user equipment, a base station, and a system.

BACKGROUND

With development of technologies, users have more requirements for communication in a high-speed scenario. For example, users perform communication on a running high-speed train. When user equipment (UE) is in a high-speed moving state, for received downlink data, a relatively large Doppler frequency shift may occur, resulting in a low downlink data throughput of the UE.

In the prior art, to increase a downlink data throughput of UE in a high-speed moving state, when downlink data received by the UE is demodulated, a Doppler frequency shift is usually first estimated according to a common reference signal (CRS). When a demodulation reference signal (DMRS) is demodulated, compensation is performed using the estimated frequency shift to improve demodulation performance of the DMRS, so as to increase the downlink data throughput of the UE.

The Doppler frequency shift is relatively large in the high-speed scenario, and a conventional frequency shift estimation method cannot achieve an expected effect and has low precision. Therefore, using the prior art data demodulation method cannot effectively increase the downlink data throughput of the UE in the high-speed moving state, and the downlink data throughput of the UE in the high-speed moving state is still relatively low.

SUMMARY

Embodiments of the present disclosure provide a data demodulation method, user equipment, a base station, and a system, so as to effectively improve a downlink data throughput of UE.

According to a first aspect, a data demodulation method is provided, where the method includes obtaining, by UE from a base station, notification information indicating that the UE is in a high-speed moving state; performing time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performing demodulation processing on the second downlink data to obtain third downlink data, where in the demodulation processing, inter-transmission time intervals (TTI) filtering for channel estimation is not performed, or a filtering coefficient as a weight of a current TTI for a channel estimation is greater than a filtering coefficient as a weight of a TTI that is at the time when the UE is in the non-high-speed moving state for a channel estimation.

With reference to the first aspect, in a first possible implementation of the first aspect, the obtaining, by UE from a base station, notification information indicating that the UE is in a high-speed moving state includes obtaining, by the UE, a radio resource control (RRC) connection reconfiguration message from the base station, where a first indicator bit in the RRC connection reconfiguration message is used to indicate that the UE is in the high-speed moving state; or obtaining, by the UE, a system message from the base station, where a second indicator bit in the system message is used to indicate that the UE is in the high-speed moving state; or obtaining, by the UE, a system message from the base station, where the system message carries a cell identifier of a high-speed railway dedicated network cell.

With reference to the first aspect, in a second possible implementation of the first aspect, the obtaining, by UE from a base station, notification information indicating that the UE is in a high-speed moving state includes obtaining, by the UE from the base station, notification information indicating that the UE is in a high-speed railway dedicated network, and determining, according to the notification information, that the UE is in the high-speed moving state; or directly obtaining, by the UE from the base station, notification information indicating that the UE is in the high-speed moving state; or obtaining, by the UE, a speed stage of the UE from the base station, and determining, when the speed stage satisfies a preset condition, that the UE is in the high-speed moving state.

With reference to the first aspect or the first or the second possible implementation of the first aspect, in a third possible implementation of the first aspect, before the obtaining, by UE from a base station, notification information indicating that the UE is in a high-speed moving state, the method further includes sending, by the UE to the base station, capability indication information, where the capability indication information is used to indicate that the UE supports time-frequency synchronization processing in a high-speed scenario and demodulation processing in the high-speed scenario.

According to a second aspect, a data demodulation method is provided, where the method includes establishing, by a base station, a connection to UE; and sending, to the UE, notification information that the UE is in a high-speed moving state, so that the UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

With reference to the second aspect, in a first possible implementation of the second aspect, before the sending, to the UE, notification information that the UE is in a high-speed moving state, the method further includes estimating a moving speed of the UE; and performing, when the moving speed is greater than a speed threshold, the step of sending, to the UE, notification information that the UE is in a high-speed moving state.

With reference to the second aspect or the first possible implementation of the second aspect, in a second possible implementation of the second aspect, the sending, to the UE, notification information that the UE is in a high-speed moving state includes sending an RRC connection reconfiguration message to the UE, where a first indicator bit in the RRC connection reconfiguration message is used to indicate that the UE is in the high-speed moving state; or sending a system message to the UE, where a second indicator bit in the system message is used to indicate that the UE is in the high-speed moving state; or sending a system message to the UE, where the system message carries a cell identifier of a high-speed railway dedicated network cell.

With reference to the second aspect or the first possible implementation of the second aspect, in a third possible implementation of the second aspect, the sending, to the UE, notification information that the UE is in a high-speed moving state includes sending, to the UE, notification information indicating that the UE is in a high-speed railway dedicated network, so that the UE determines, according to the notification information, that the UE is in the high-speed moving state; or directly sending, to the UE, notification information indicating that the UE is in the high-speed moving state; or sending a speed stage of the UE to the UE, so that the UE determines, when the speed stage satisfies a preset condition, that the UE is in the high-speed moving state.

With reference to the second aspect or the first or the second or the third possible implementation of the second aspect, in a fourth possible implementation of the second aspect, before the sending, to the UE, notification information that the UE is in a high-speed moving state, the method further includes receiving capability indication information sent by the UE, where the capability indication information is used to indicate that the UE supports time-frequency synchronization processing in a high-speed scenario and demodulation processing in the high-speed scenario.

According to a third aspect, UE is provided, where the UE includes an obtaining unit configured to obtain, from a base station, notification information indicating that the UE is in a high-speed moving state; a time-frequency synchronization processing unit configured to perform time-frequency synchronization processing on first downlink data according to the notification information obtained by the obtaining unit to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and a demodulation processing unit configured to perform demodulation processing on the second downlink data obtained by the time-frequency synchronization processing unit to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

With reference to the third aspect, in a first possible implementation of the third aspect, the obtaining unit is configured to obtain an RRC connection reconfiguration message from the base station, where a first indicator bit in the RRC connection reconfiguration message is used to indicate that the UE is in the high-speed moving state; or obtain a system message from the base station, where a second indicator bit in the system message is used to indicate that the UE is in the high-speed moving state; or obtain a system message from the base station, where the system message carries a cell identifier of a high-speed railway dedicated network cell.

With reference of the third aspect, in a second possible implementation of the third aspect, the obtaining unit is configured to obtain notification information indicating that the UE is in a high-speed railway dedicated network from the base station, and determine, according to the notification information, that the UE is in the high-speed moving state; or directly obtain, from the base station, notification information indicating that the UE is in the high-speed moving state; or obtain a speed stage of the UE from the base station, and determine, when the speed stage satisfies a preset condition, that the UE is in the high-speed moving state.

With reference to the third aspect or the first or second possible implementation of the third aspect, in a third possible implementation of the third aspect, the UE further includes a sending unit configured to send capability indication information to the base station before the obtaining unit obtains, from the base station, the notification information indicating that the UE is in a high-speed moving state, where the capability indication information is used to indicate that the UE supports time-frequency synchronization processing in a high-speed scenario and demodulation processing in the high-speed scenario.

According to a fourth aspect, a base station is provided, where the base station includes a connection establishment unit configured to establish a connection to UE; a sending unit configured to send, to the UE, notification information that the UE is in a high-speed moving state, so that the UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

With reference to the fourth aspect, in a first possible implementation of the fourth aspect, the base station further includes a speed estimation unit configured to estimate a moving speed of the UE before the sending unit sends, to the UE, the notification information that the UE is in a high-speed moving state; where the sending unit is configured to perform, when the moving speed estimated by the speed estimation unit is greater than a speed threshold, the step of sending, to the UE, notification information that the UE is in a high-speed moving state.

With reference to the fourth aspect or the first possible implementation of the fourth aspect, in a second possible implementation of the fourth aspect, the sending unit is configured to send an RRC connection reconfiguration message to the UE, where a first indicator bit in the RRC connection reconfiguration message is used to indicate that the UE is in the high-speed moving state; or send a system message to the UE, where a second indicator bit in the system message is used to indicate that the UE is in the high-speed moving state; or send a system message to the UE, where the system message carries a cell identifier of a high-speed railway dedicated network cell.

With reference to the fourth aspect or the first possible implementation of the fourth aspect, in a third possible implementation of the fourth aspect, the sending unit is configured to send, to the UE, notification information indicating that the UE is in a high-speed railway dedicated network, so that the UE determines that the UE is in the high-speed moving state according to the notification information; or directly send, to the UE, notification information indicating that the UE is in the high-speed moving state; or send a speed stage of the UE to the UE, so that the UE determines, when the speed stage satisfies a preset condition, that the UE is in the high-speed moving state.

With reference to the fourth aspect or the first or the second or the third possible implementation of the fourth aspect, in a fourth possible implementation of the fourth aspect, the base station further includes a receiving unit configured to receive capability indication information sent by the UE before the sending unit sends, to the UE, the notification information that the UE is in a high-speed moving state, where the capability indication information is used to indicate that the UE supports time-frequency synchronization processing in a high-speed scenario and demodulation processing in the high-speed scenario.

According to a fifth aspect, UE is provided, where the UE includes a communications interface; a memory; a processor; and an application program physically stored in the memory, where the application program includes an instruction that may be used to enable the processor and the UE to execute the following process: obtaining by the UE from a base station, notification information indicating that the UE is in the high-speed moving state; performing time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performing demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

With reference to the fifth aspect, in a first possible implementation of the fifth aspect, that the application program may be used to enable the processor and the UE to execute the instruction of obtaining, by the UE from a base station, notification information indicating that the UE is in the high-speed moving state is obtaining, by the UE, an RRC connection reconfiguration message from the base station, where a first indicator bit in the RRC connection reconfiguration message is used to indicate that the UE is in the high-speed moving state; or obtaining, by the UE, a system message from the base station, where a second indicator bit in the system message is used to indicate that the UE is in the high-speed moving state; or obtaining, by the UE, a system message from the base station, where the system message carries a cell identifier of a high-speed railway dedicated network cell.

With reference to the fifth aspect, in a second possible implementation of the fifth aspect, that the application program may be used to enable the processor and the UE to execute the instruction of obtaining, by the UE from a base station, notification information indicating that the UE is in the high-speed moving state is obtaining, by the UE from the base station, notification information indicating that the UE is in a high-speed railway dedicated network, and determining, according to the notification information, that the UE is in the high-speed moving state; or directly obtaining, by the UE from the base station, notification information indicating that the UE is in the high-speed moving state; or obtaining, by the UE, a speed stage of the UE from the base station, and determining, when the speed stage satisfies a preset condition, that the UE is in the high-speed moving state.

With reference to the fifth aspect or the first or the second possible implementation of the fifth aspect, in a third possible implementation of the fifth aspect, the processor is further configured to perform the following operation according to the program instruction stored in the memory: sending, by the UE, capability indication information to the base station before the UE obtains, from the base station, the notification information indicating that the UE is in a high-speed moving state, where the capability indication information is used to indicate that the UE supports time-frequency synchronization processing in a high-speed scenario and demodulation processing in the high-speed scenario.

According to a sixth aspect, a base station is provided, where the base station includes a communications interface; a memory; a processor; and an application program physically stored in the memory, where the application program includes an instruction that may be used to enable the processor and the base station to execute the following process: establishing, by a base station, a connection to UE; and sending, to the UE, notification information that the UE is in a high-speed moving state, so that the UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performs demodulation processing on the second downlink data to obtain third downlink data, where in the demodulation processing, inter-TTIs filtering for channel estimation is not performed, or a filtering coefficient as a weight of a current TTI for a channel estimation is greater than a filtering coefficient as a weight of a TTI that is at the time when the UE is in the non-high-speed moving state for a channel estimation.

With reference to the sixth aspect, in a first possible implementation of the sixth aspect, the application program further includes an instruction that may be used to enable the processor and the base station to execute the following process: estimating a moving speed of the UE before the sending, to the UE, notification information that the UE is in the high-speed moving state; and performing, when the moving speed is greater than a speed threshold, the step of sending, to the UE, notification information that the UE is in a high-speed moving state.

With reference to the sixth aspect or the first possible implementation of the sixth aspect, in a second possible implementation of the sixth aspect, that the application program may be used to enable the processor and the base station to execute the instruction of sending, to the UE, notification information that the UE is in a high-speed moving state is: sending an RRC connection reconfiguration message to the UE, where a first indicator bit in the RRC connection reconfiguration message is used to indicate that the UE is in the high-speed moving state; or sending a system message to the UE, where a second indicator bit in the system message is used to indicate that the UE is in the high-speed moving state; or sending a system message to the UE, where the system message carries a cell identifier of a high-speed railway dedicated network cell.

With reference to the sixth aspect or the first possible implementation of the sixth aspect, in a third possible implementation of the sixth aspect, the operation, performed by the processor, of the sending, to the UE, notification information that the UE is in a high-speed moving state includes sending, to the UE, notification information indicating that the UE is in a high-speed railway dedicated network, so that the UE determines, according to the notification information, that the UE is in the high-speed moving state; or directly sending, to the UE, notification information indicating that the UE is in the high-speed moving state; or sending a speed stage of the UE to the UE, so that the UE determines, when the speed stage satisfies a preset condition, that the UE is in the high-speed moving state.

With reference to the sixth aspect or the first or the second or the third possible implementation of the sixth aspect, in a fourth possible implementation of the sixth aspect, the processor is further configured to perform the following operation according to the program instruction stored in the memory: receiving capability indication information sent by the UE before the sending, to the UE, the notification information that the UE is in a high-speed moving state, where the capability indication information is used to indicate that the UE supports time-frequency synchronization processing in a high-speed scenario and demodulation processing in the high-speed scenario.

According to a seventh aspect, a data demodulation system is provided, where the system includes a base station configured to establish a connection to UE, and send, to the UE, notification information that the UE is in a high-speed moving state; and the UE configured to obtain, from the base station, the notification information indicating that the UE is in a high-speed moving state; perform time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and perform demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

With reference to the seventh aspect, in a first possible implementation of the seventh aspect, the base station is further configured to estimate a moving speed of the UE before the sending, to the UE, notification information that the UE is in a high-speed moving state; perform, when the moving speed is greater than a speed threshold, the step of sending, to the UE, notification information that the UE is in a high-speed moving state.

With reference to the seventh aspect or the first possible implementation of the seventh aspect, in a second possible implementation of the seventh aspect, the base station is configured to send an RRC connection reconfiguration message to the UE, where a first indicator bit in the RRC connection reconfiguration message is used to indicate that the UE is in the high-speed moving state; or send a system message to the UE, where a second indicator bit in the system message is used to indicate that the UE is in the high-speed moving state; or send a system message to the UE, where the system message carries a cell identifier of a high-speed railway dedicated network cell.

With reference to the second possible implementation of the seventh aspect, in a third possible implementation of the seventh aspect, the UE is configured to obtain the RRC connection reconfiguration message, where the first indicator bit in the RRC connection reconfiguration message is used to indicate that the UE is in the high-speed moving state; or obtain the system message, where the second indicator bit in the system message is used to indicate that the UE is in the high-speed moving state; or obtain the system message, where the system message carries a cell identifier of a high-speed railway dedicated network cell.

The embodiments of the present disclosure provide a data demodulation method. The method includes first obtaining notification information indicating that UE is in a high-speed moving state; then performing time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and then performing demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation. Downlink data received by the UE in a high-speed scenario has a different characteristic from that in a conventional scenario, and a frequency shift of the downlink data received by the UE in the high-speed scenario changes rapidly. After that the UE is in the high-speed moving state is learnt by obtaining the notification information, a method for increasing some parameters speeds up adjustment of the frequency shift estimation, so that the UE obtains good downlink demodulation performance and improves a downlink data throughput of the UE.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

A data demodulation method according to the embodiments of the present disclosure may be applied to various high-speed scenarios, for example, mobile communication on a high-speed railway, mobile communication on an aircraft, or the like. For ease of description, the mobile communication on the high-speed railway is used as an example for description.

Figure 1:
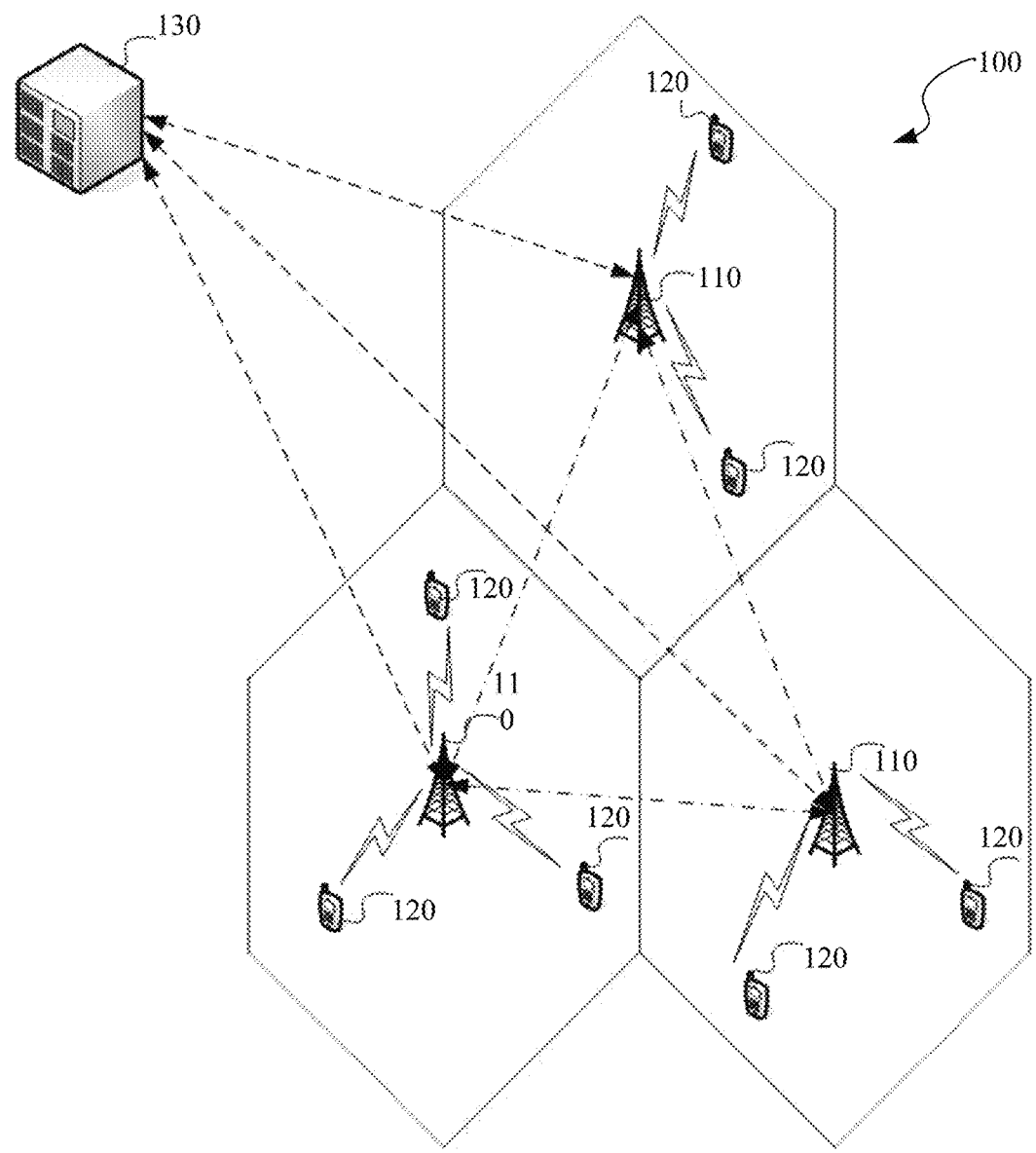
FIG. 1 is a schematic diagram of an application scenario of a data demodulation method according to an embodiment of the present disclosure.

FIG. 1 is a schematic diagram of an application scenario of a data demodulation method according to an embodiment of the present disclosure. The data demodulation method may be applied to a 3rd Generation (3G) Mobile Communication network, or may be applied to a Long Term Evolution (LTE) network. For ease of description, the LTE network is used as example for description. In an evolved-universal terrestrial radio access network (E-UTRAN) communications system 100 in the LTE network. Referring to FIG. 1, the E-UTRAN communications system 100 includes several base stations 110 and another network entity to support communication between several UEs 120. Some UEs 120 are on a running high-speed train (HST). For these UEs 120, the data demodulation method according to this embodiment of the present disclosure may be used to demodulate downlink data received from the base stations 110.

The base station 110 may be an evolved NodeB (eNB) in the LTE. One base station 110 may support/manage one or more cells. When the UE 120 needs to communicate with a network, it selects a cell to initiate access.

The UE 120 may also be referred to as a mobile terminal (MT), a mobile station (MS), or the like, and may communicate with one or more core networks using a radio access network (RAN).

A core network device 130 is connected to one or more base stations 110, and the core network device 130 includes a mobility management entity (MME).

The data demodulation method according to this embodiment of the present disclosure may be applied to different communications systems. Specific base station devices vary with different communications systems, and specifically, may be a base station controller (BSC), a radio network controller (RNC), an eNB, or a Node B.

Figure 2:
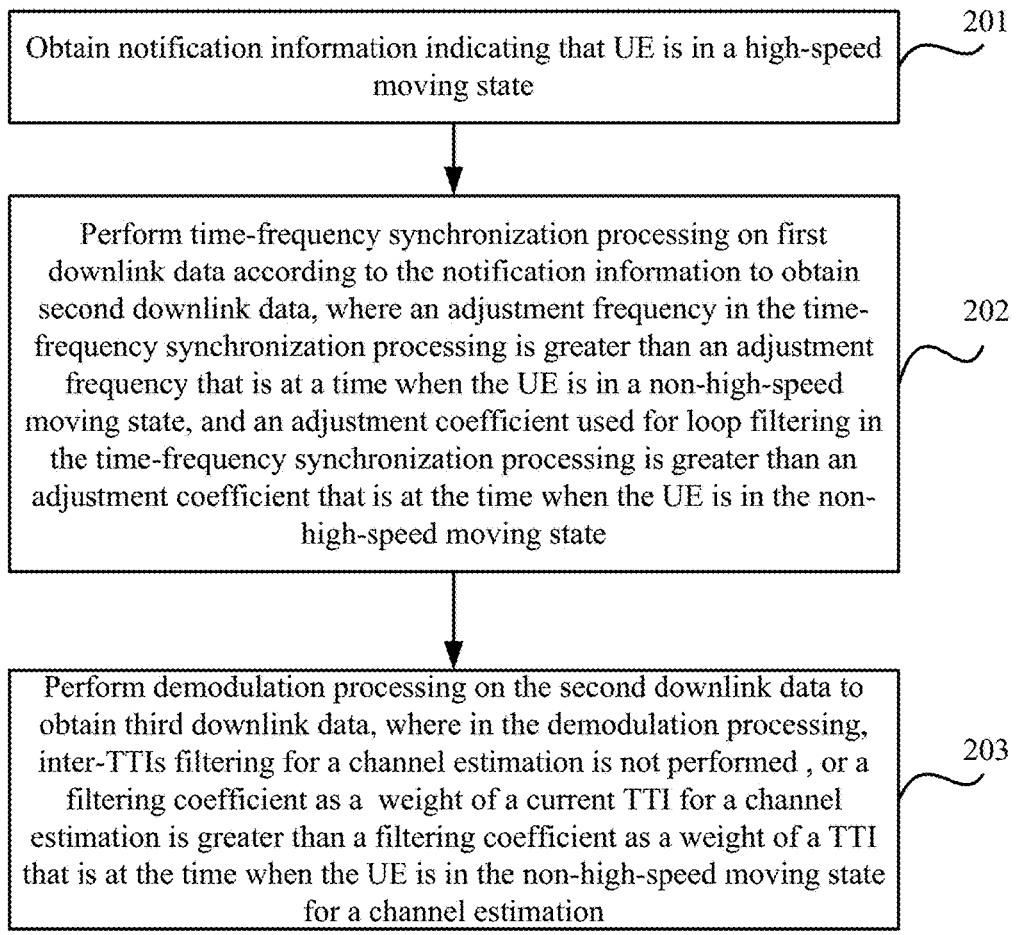
FIG. 2 is a flowchart of a data demodulation method according to Embodiment 1 of the present disclosure.

FIG. 2 is a flowchart of a data demodulation method according to Embodiment 1 of the present disclosure. The method is executed by UE. Referring to FIG. 2, the method includes the following steps.

Step 201: The UE obtains, from a base station, notification information indicating that the UE is in a high-speed moving state.

There are multiple scenarios in which the UE is in the high-speed moving state. One typical application scenario is that the UE is on a running HST. In this case, the UE is covered by a high-speed railway dedicated network. This scenario is called a high-speed railway dedicated network coverage scenario. After the UE enters the high-speed railway dedicated network coverage scenario, if the UE is in an idle state, the UE may learn, by reading a system message, that the UE is in the high-speed moving state; and if the UE is in a connected state, the UE may learn, by reading a system message or by reading network dedicated signaling, that the UE is in the high-speed moving state.

In this embodiment of the present disclosure, the base station may also indicate, using an implicit manner, that the UE is in the high-speed moving state. For example, a cell identifier of a high-speed railway dedicated network cell is carried in a system message. After receiving the system message, the UE may determine, by comparing a current cell identifier with the cell identifier of the high-speed railway dedicated network cell, that the UE is in the high-speed railway dedicated network cell and that the UE is in the high-speed moving state.

In this embodiment of the present disclosure, the UE may obtain a RRC connection reconfiguration message from the base station, where a first indicator bit in the RRC connection reconfiguration message is used to indicate that the UE is in the high-speed moving state; or the UE may obtain a system message from the base station, where a second indicator bit in the system message is used to indicate that the UE is in the high-speed moving state; or the UE obtains a system message from the base station, where the system message carries a cell identifier of a high-speed railway dedicated network cell. The first indicator bit is one bit of the RRC connection reconfiguration message. The first indicator bit may be predetermined as 0, representing the high-speed state; or the first indicator bit may be predetermined as 1, representing the high-speed state. The second indicator bit is one bit of the system message. The second indicator bit may be predetermined as 0, representing the high-speed state; or the second indicator bit may be predetermined as 1, representing the high-speed state. The UE may directly obtain, from the base station, notification information indicating that the UE is in the high-speed moving state; or the UE may obtain, from the base station, other notification information that may be used to determine that the UE is in the high-speed moving state, and the UE determines, according to the other notification information obtained from the base station that may be used to determine that the UE is in the high-speed moving state, that the UE is in the high-speed moving state.

In one possible implementation of this embodiment of the present disclosure, the UE obtains, from the base station, notification information indicating that the UE is in a high-speed railway dedicated network, and determines, according to the notification information, that the UE is in the high-speed moving state.

In another possible implementation of this embodiment of the present disclosure, the UE obtains a speed stage of the UE from the base station, and determines, when the speed stage of the UE satisfies a preset condition, that the UE is in the high-speed moving state.

The speed stage of the UE means a range of a speed of the UE. The base station may add an information element (IE) into the RRC dedicated signaling or the system message sent to the UE, to indicate the speed stage of the UE using the added IE. A variable name and a variable type of the IE are not limited. For example, the speed stage of the UE is indicated using an enumerated variable. For example,
  normal: represents a speed of the UE: speed<100 km/h
  medium: represents a speed of UE: 100 km/h<speed<200 km/h
  high: represents a speed of the UE: 200 km/h<speed<300 km/h
  very high: represents a speed of the UE: speed>300 km/h After obtaining the speed stage of the UE, the UE may determine, according to the preset condition, whether the UE is in the high-speed moving state. For example, when the speed stage of the UE is high, if the preset condition is that it is considered that the UE is in the high-speed moving state when the speed of the UE exceeds 200 km/h, then the UE determines that the UE is in the high-speed moving state; and if the preset condition is that it is considered that the UE is in the high-speed moving state only when the speed of the UE exceeds 300 km/h, then the UE determines that the UE is in a non-high-speed moving state.

The speed stages are not limited to the foregoing specific numeral values. The base station may determine a speed stage of the UE according to a location determined on a network side, or using another method. No limitation is imposed in the present disclosure.

In another possible implementation of this embodiment of the present disclosure, the UE obtains a cell identifier list of high-speed railway dedicated network cells from the base station, and determines, when a cell identifier of a cell in which the UE is currently located exists in the cell identifier list, that the UE is in the high-speed moving state.

The base station may add an IE into the system message to indicate the cell identifier list of the high-speed railway dedicated network cell using the IE. In this embodiment of the present disclosure, the system message added with the IE may be delivered by either a base station in the high-speed railway dedicated network or a base station in a public network, so that the UE can obtain the cell identifier list of high-speed railway dedicated network cells before entering a high-speed railway dedicated network cell.

In addition, the UE may send capability indication information to the base station before obtaining, from the base station, the notification information indicating that the UE is in a high-speed moving state. The capability indication information is used to indicate that the UE supports time-frequency synchronization processing in a high-speed scenario and demodulation processing in the high-speed scenario.

Step 202: Perform time-frequency synchronization processing on first downlink data according to the notification information to obtain second downlink data.

An adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state.

The first downlink data may be original downlink data received by the UE.

A purpose of fast convergence of a time shift and a frequency shift may be achieved by speeding up the adjustment frequency in time-frequency synchronization and using a larger adjustment coefficient in the loop filtering. A specific numeral value of the adjustment frequency may be obtained by means of commissioning, and the commissioning is performed on different chips or different UEs.

In this embodiment of present disclosure, the UE uses a larger adjustment coefficient in loop filtering when performing the time-frequency synchronization processing on the downlink data. Configuration of this parameter may affect frequency tracking performance. Dynamic performance and static performance are a pair of contradictory performances. A larger adjustment coefficient may bring better dynamic tracking performance at the expense of stability of the static performance.

Step 203: Perform demodulation processing on the second downlink data to obtain third downlink data.

In the demodulation processing, TTI filtering for a channel estimation is not performed, or a filtering coefficient as a weight of a current TTI of a channel estimation is greater than a filtering coefficient as a weight of a TTI that is at the time when the UE is in the non-high-speed moving state for a channel estimation.

After the time-frequency synchronization processing is performed on the first downlink data to obtain the second downlink data, the demodulation processing is then performed on the second downlink data to obtain the third downlink data.

During channel estimation in the demodulation processing, the speed of the UE may be staged. Each speed stage is corresponding to a different Wiener filtering coefficient. After the notification information indicating that the UE is in a high-speed moving state is obtained, a Wiener filtering coefficient applicable to the high-speed scenario is used. In addition, a current TTI and a previous TTI may be used when channel estimation is performed. In the high-speed scenario, channels change rapidly, and channel correlation with a history TTI is lower than that in a common scenario. A weight of the current TTI may be increased by modifying weighting coefficients for different TTIs.

For example, when a frequency shift is estimated, a weight of a historical frequency shift in the frequency shift estimation and a filtering coefficient of a current residual frequency shift need to be adjusted:

$$f_d(k) = \sum_{i=k-m-1}^{k-1} \alpha_i \cdot f_d(i) + \beta \cdot \varepsilon_d(k).$$

In a low-speed scenario, to obtain relatively stable frequency shift estimation, weighted averaging needs to be performed on frequency shift values in a time period. A time window is generally tens of milliseconds based on different implementations, that is, a value of m in the foregoing formula. $\alpha_i$ represents a weighting coefficient of a frequency shift at each historical time point, and in a cumulative average algorithm, a value of $\alpha_i$ is $$\alpha_i = \frac{1}{m}.$$

When the UE is in the high-speed scenario, timeliness of the frequency shift tracking is obtained at the expense of a certain extent of stability in the frequency shift estimation. On one hand, a filtering window can be shortened to decrease the value of m. On the other hand, $\alpha_i$ can be adjusted to reduce a coefficient of a weighted item at a longer distance and increase a coefficient of a weighted item at a smaller distance. In addition, $\beta$, a filtering coefficient of a current residual frequency shift, also needs to be increased to increase a weight of the current residual frequency shift in $f_d(k)$, and so on.

This embodiment of the present disclosure provides a data demodulation method. The method includes first obtaining notification information indicating that UE is in a high-speed moving state; then performing time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and then performing demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation. Downlink data received by the UE in a high-speed scenario has a different characteristic from that in a conventional scenario, and a frequency shift of the downlink data received by the UE in the high-speed scenario changes rapidly. After that the UE is in the high-speed moving state is learnt by obtaining the notification information, a method for increasing some parameters speeds up adjustment of the frequency shift estimation, so that the UE obtains good downlink demodulation performance and improves a downlink data throughput of the UE.

Figure 3:
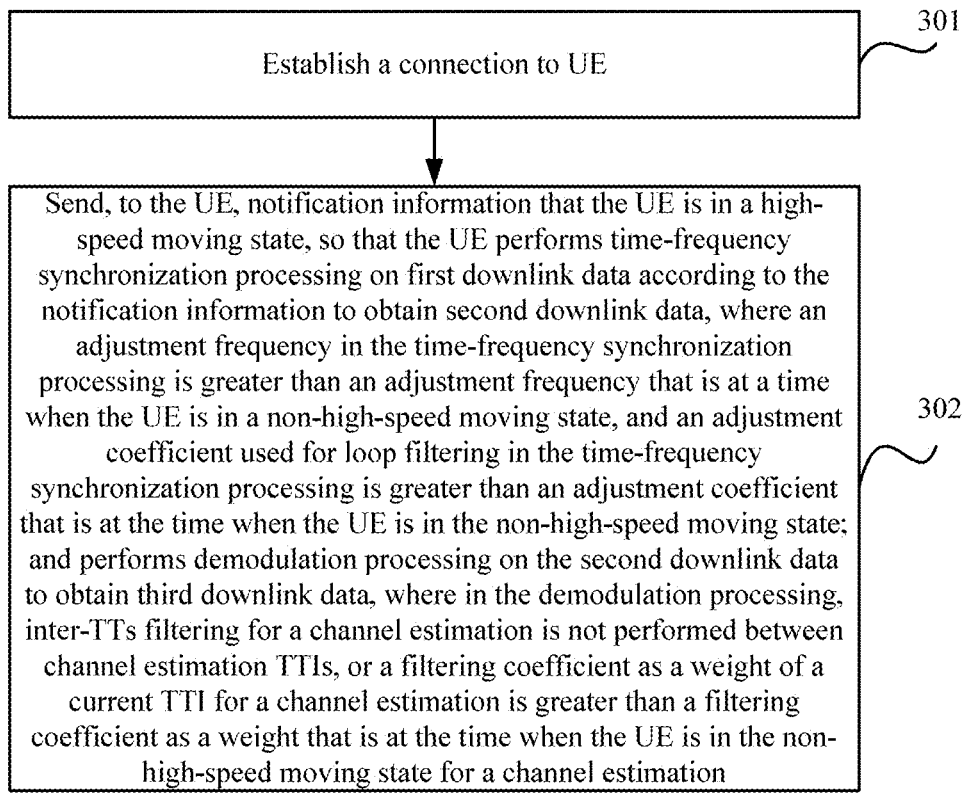
FIG. 3 is a flowchart of a data demodulation method according to Embodiment 2 of the present disclosure.

FIG. 3 is a flowchart of a data demodulation method according to Embodiment 2 of the present disclosure. The method is executed by a base station. Referring to FIG. 3, the method includes the following steps.

Step 301: Establish a connection to UE.

When a dedicated network is used for coverage in a high-speed scenario, that is, a specific area is covered by a specific base station, after establishing the connection to the UE, the base station may send, to the UE, notification information that the UE is in the high-speed moving state.

Application scenarios of this embodiment of the present disclosure not only include a high-speed railway dedicated network coverage scenario, but also include a public network coverage scenario. In the high-speed railway dedicated network coverage scenario, the UE may be in the high-speed moving state or a non-high-speed moving state. In the public network coverage scenario, the UE may also be in the high-speed moving state or a non-high-speed moving state. To avoid sending, to the UE in the non-high-speed moving state, the notification information that the UE is in a high-speed moving state, the base station may first estimate a moving speed of the UE, and when the moving speed is greater than a speed threshold, sends, to the UE, the notification information that the UE is in a high-speed moving state.

The moving speed of the UE may be estimated using, but not limited to, the following manners.

Manner 1: Obtain a moving state reported by the UE using an IE: When accessing a network, the UE that supports reporting of a moving state may include an IE about the moving state of the UE into a signaling RRC connection establishment completion message sent to the base station. The base station may read a speed stage of the UE from the received message.

Manner 2: Estimate a moving speed of the UE according to a quantity of UE switching times: Speed stages are divided according to a quantity of UE switching times in unit time. For example, the UE switches the speed for more than five switching times within one minute, and this is defined as a high-speed.

Manner 3: Perform Doppler estimation: The base station determines a speed stage of the UE according to a Doppler frequency shift of an uplink signal of the UE. For example, for more than 1000Hz, a high speed is determined.

Manner 4: Locate the UE on a network side: The base station may obtain location information of the UE using a positioning method such as Enhanced Cell ID (ECID) and Observed Time Difference of Arrival (OTDOA). The network side may obtain UE speed information according to UE location change information, so as to divide the UE speed into speed stages, for example, a speed greater than 200 km/h is a high speed.

Manner 5: Obtain application layer data: The base station obtains UE speed data information from the application layer including speed information.

Step 302: Send, to the UE, notification information that the UE is in a high-speed moving state, so that the UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

In this embodiment of the present disclosure, the notification information may be information specifically used to indicate that the UE is in the high-speed moving state, or may be existing information. One bit used to indicate that the UE is in the high-speed moving state is added into the existing information. Preferably, the base station may send an RRC connection reconfiguration message to the UE, where a first indicator bit in the RRC connection reconfiguration message is used to indicate that the UE is in the high-speed moving state; or the base station may send a system message to the UE, where a second indicator bit in the system message is used to indicate that the UE is in the high-speed moving state; or sends a system message to the UE, where the system message carries a cell identifier of a high-speed railway dedicated network cell.

In this embodiment of present disclosure, the base station may directly send, to the UE, the notification information that the UE is in a high-speed moving state, or may send, to the UE using an implicit manner, the notification information that the UE is in a high-speed moving state. The following manners may be included: sending, to the UE, notification information indicating that the UE is in a high-speed railway dedicated network, so that the UE determines, according to the notification information, that the UE is in the high-speed moving state; or directly sending, to the UE, notification information indicating that the UE is in the high-speed moving state; or sending a speed stage of the UE to the UE, so that the UE determines, when the speed stage satisfies a preset condition, that the UE is in the high-speed moving state.

Optionally, before sending, to the UE, the notification information that the UE is in a high-speed moving state, the base station may first receive capability indication information sent by the UE. The capability indication information is used to indicate that the UE supports time-frequency synchronization processing in a high-speed scenario and demodulation processing in the high-speed scenario.

The data demodulation method according to this embodiment of the present disclosure may be applied to different communications systems. Specific compositions of the base station vary with the different communications systems. The following describes the data demodulation method in details with reference to different communications systems.

Figure 4:
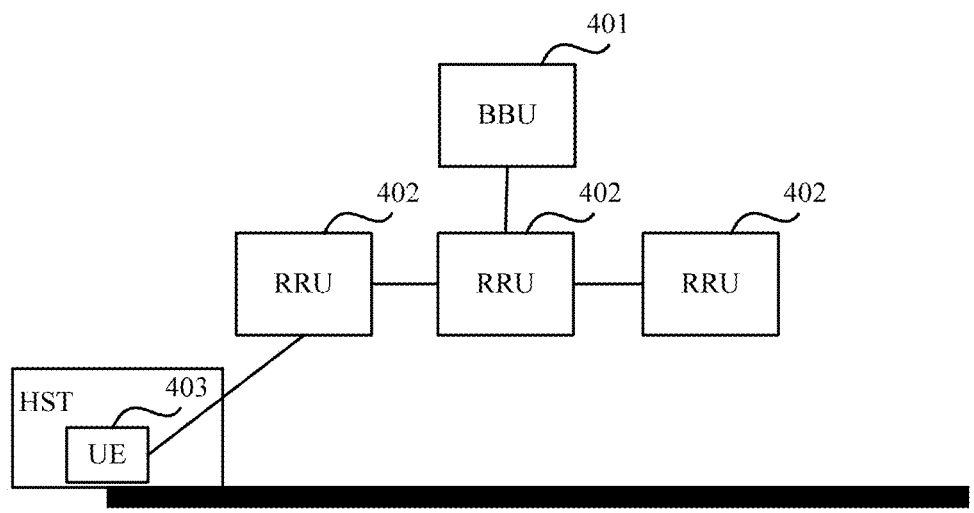
FIG. 4 is a schematic diagram of a specific application scenario of a data demodulation method according to an embodiment of the present disclosure.

FIG. 4 is a schematic diagram of a specific application scenario of a data demodulation method according to an embodiment of the present disclosure. Referring to FIG. 4, in a high-speed scenario, a dedicated network is used for coverage. A base station includes a baseband unit (BBU) 401 and several radio remote units (RRU) 402. UE 403 on a HST communicates with the BBU 401 using the several RRUs 402.

Figure 5:
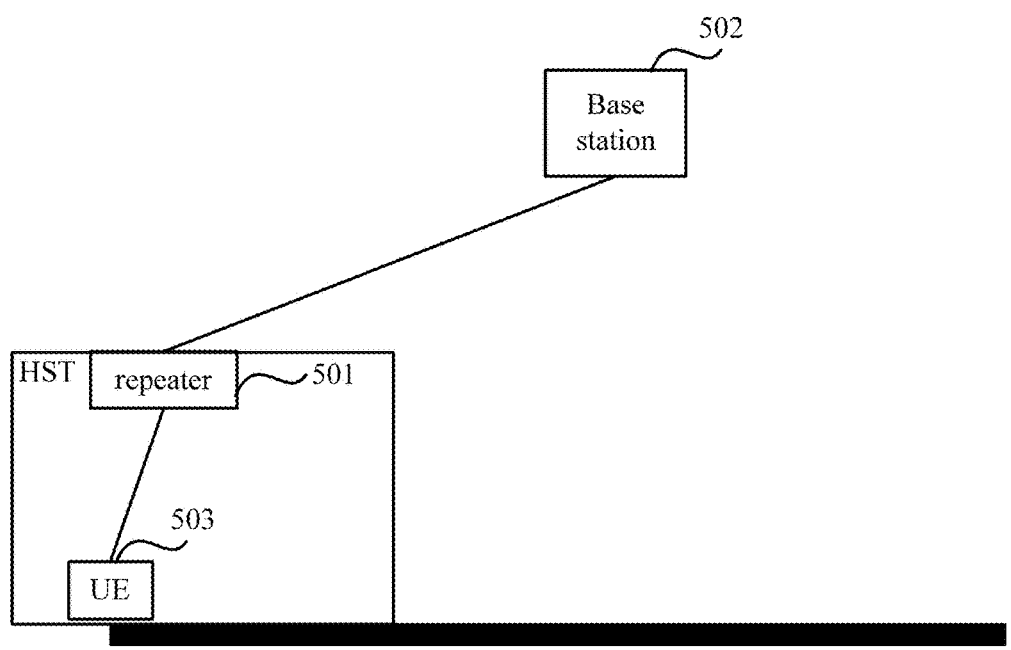
FIG. 5 is a schematic diagram of another specific application scenario of a data demodulation method according to an embodiment of the present disclosure.

FIG. 5 is a schematic diagram of another specific application scenario of a data demodulation method according to an embodiment of the present disclosure. Referring to FIG. 5, in a high-speed scenario, a dedicated network is used for coverage and an independent base station is deployed. A repeater 501 may be mounted on a HST as needed. The repeater 501 serves as only a power amplifier to enlarge power of downlink data received from the base station 502 and then forwards the data to UE 503.

Figure 6:
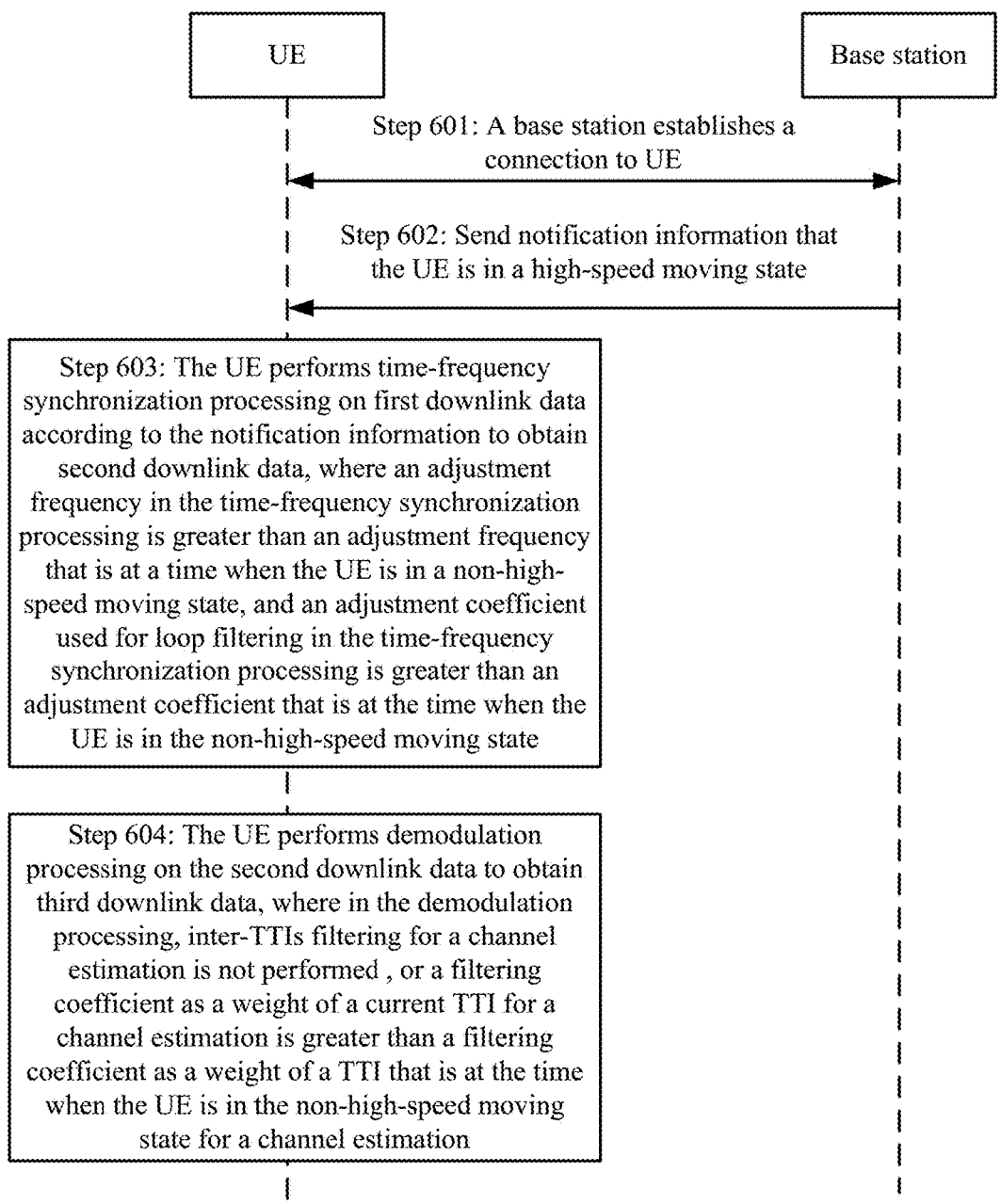
FIG. 6 is a signaling flowchart of a data demodulation method according to Embodiment 3 of the present disclosure.

FIG. 6 is a signaling flowchart of a data demodulation method according to Embodiment 3 of the present disclosure. The method is based on the specific application scenario shown in FIG. 4 or FIG. 5. Referring to FIG. 6, the method includes the following steps.

Step 601: A base station establishes a connection to UE.

Step 602: The base station sends, to the UE, notification information that the UE is in a high-speed moving state.

Step 603: The UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state.

Step 604: The UE performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

Figure 7:
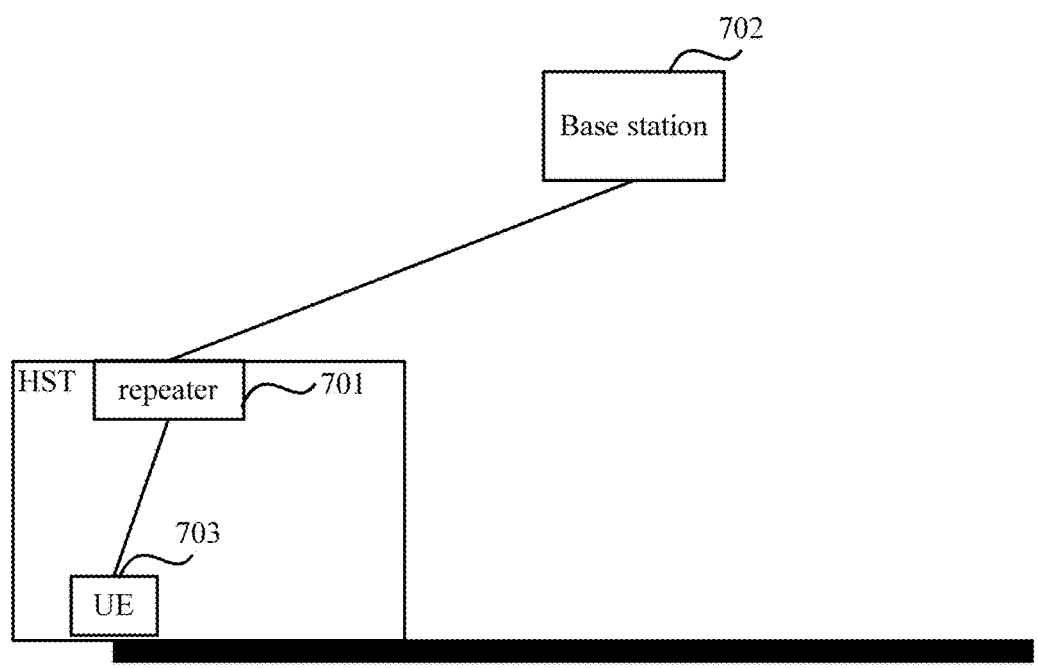
FIG. 7 is a schematic diagram of another specific application scenario of a data demodulation method according to an embodiment of the present disclosure.

FIG. 7 is a schematic diagram of another specific application scenario of a data demodulation method according to an embodiment of the present disclosure. Referring to FIG. 7, in a high-speed scenario, a public network is used for coverage and an independent base station is deployed. A repeater 701 may be mounted on a HST as needed. The repeater 701 serves as only a power amplifier to enlarge power of downlink data received from the base station 702 and forwards the data to UE 703.

Figure 8:
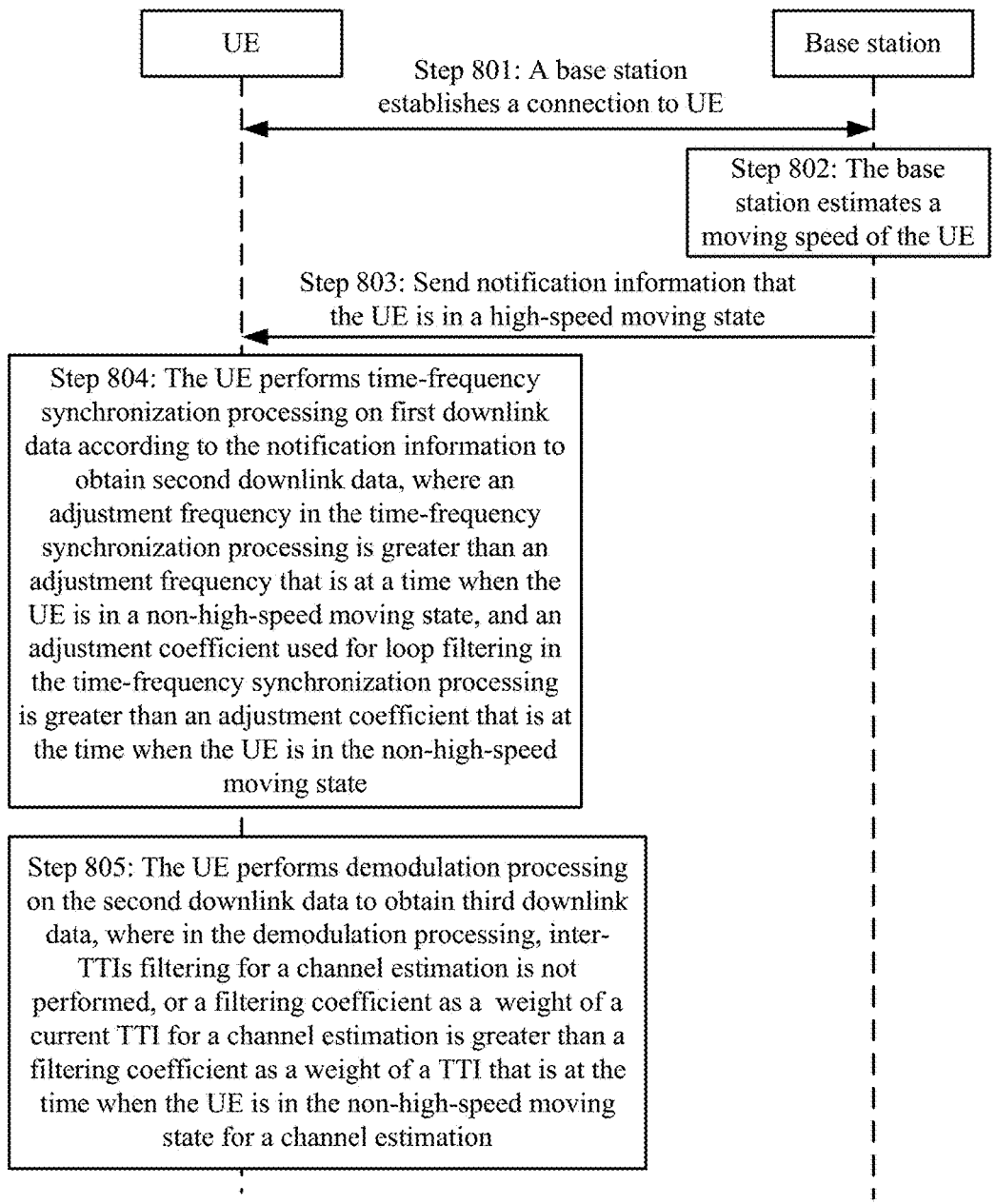
FIG. 8 is a signaling flowchart of a data demodulation method according to Embodiment 4 of the present disclosure.

FIG. 8 is a signaling flowchart of a data demodulation method according to Embodiment 4 of the present disclosure. The method is based on the specific application scenario shown in FIG. 7. Referring to FIG. 8, the method includes the following steps.

Step 801: A base station establishes a connection to UE.

Step 802: The base station estimates a moving speed of the UE.

When the moving speed is greater than a speed threshold, step 803 is performed.

Step 803: The base station sends, to the UE, notification information that the UE is in a high-speed moving state.

Step 804: The UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state.

Step 805: The UE performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient of a weight that is at the time when the UE is in the non-high-speed moving state.

Figure 9:
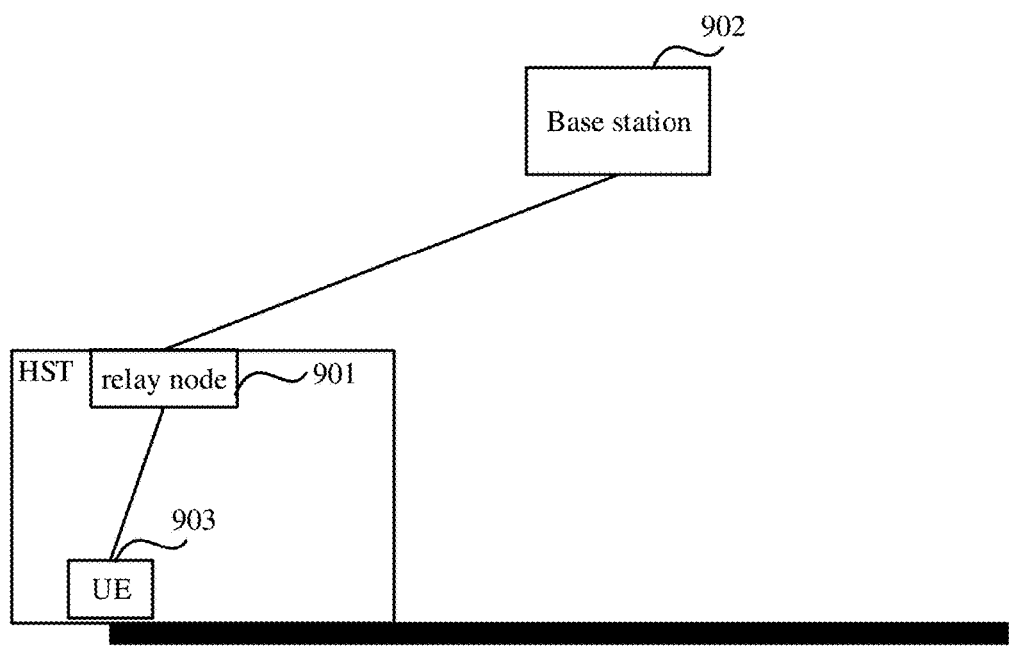
FIG. 9 is a schematic diagram of another specific application scenario of a data demodulation method according to an embodiment of the present disclosure.

FIG. 9 is a schematic diagram of another specific application scenario of a data demodulation method according to an embodiment of the present disclosure. Referring to FIG. 9, in the scenario, a relay node 901 is mounted on a HST. The relay node 901 first demodulates downlink data received from a base station 902, and then sends the data obtained after the demodulation to UE 903. In the scenario, time-frequency synchronization and a demodulation solution are adjusted on a backhaul link.

Figure 10:
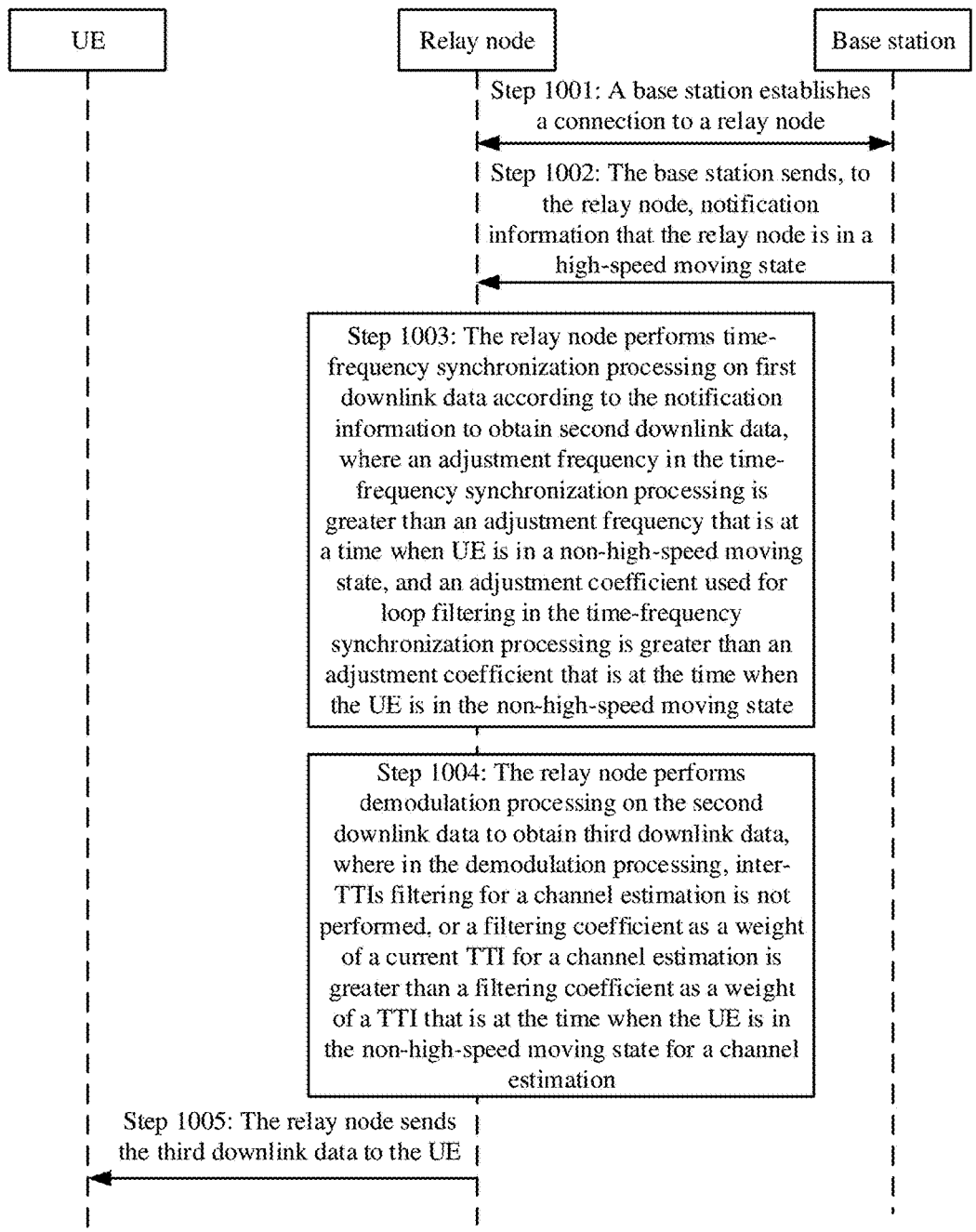
FIG. 10 is a signaling flowchart of a data demodulation method according to Embodiment 5 of the present disclosure.

FIG. 10 is a signaling flowchart of a data demodulation method according to Embodiment 5 of the present disclosure. The method is based on the specific application scenario shown in FIG. 9. Referring to FIG. 10, the method includes the following steps.

Step 1001: A base station establishes a connection to a relay node.

In a case that in a high-speed scenario, a dedicated network is used for coverage, that is, a specific area is covered by a specific base station, after the base station establishes the connection to the relay node, step 1002 is performed.

In a case that in a high-speed scenario, a public network is used for coverage, that is, an area covered by a base station includes not only the high-speed scenario but also includes a common scenario, after establishing the connection to the relay node, the base station further estimates a moving speed of the relay node. When the moving speed is greater than a speed threshold, step 1002 is performed.

Step 1002: The base station sends notification information that the relay node is in a high-speed moving state to the relay node.

Step 1003: The relay node performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state.

Step 1004: The relay node performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

Step 1005: The relay node sends the third downlink data to the UE.

Figure 11:
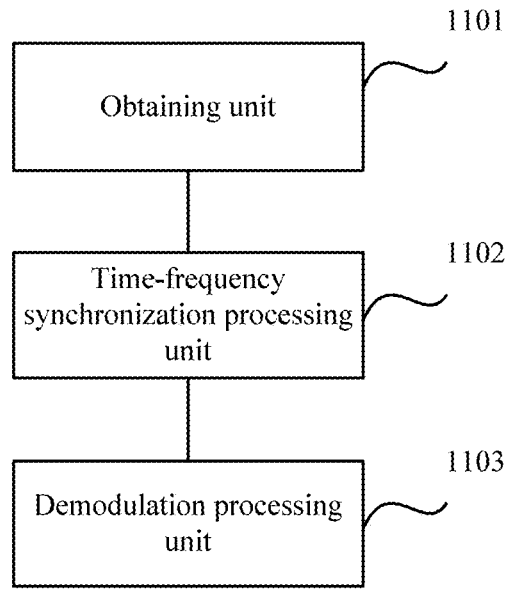
FIG. 11 is a structural diagram of a data demodulation apparatus according to Embodiment 6 of the present disclosure.

FIG. 11 is a structural diagram of a data demodulation apparatus according to Embodiment 6 of the present disclosure. The apparatus is disposed in UE. Referring to FIG. 11, the apparatus includes an obtaining unit 1101 configured to obtain, from a base station, notification information indicating that the UE is in a high-speed moving state; a time-frequency synchronization processing unit 1102 configured to perform time-frequency synchronization processing on first downlink data according to the notification information obtained by the obtaining unit 1101 to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and a demodulation processing unit 1103 configured to perform demodulation processing on the second downlink data obtained by the time-frequency synchronization processing unit 1102 to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

Preferably, the obtaining unit 1101 is configured to obtain an RRC connection reconfiguration message from the base station, where a first indicator bit in the RRC connection reconfiguration message is used to indicate that the UE is in the high-speed moving state; or obtain a system message from the base station, where a second indicator bit in the system message is used to indicate that the UE is in the high-speed moving state; or obtain a system message from the base station, where the system message carries a cell identifier of a high-speed railway dedicated network cell.

Optionally, the obtaining unit 1101 is configured to obtain notification information indicating that the UE is in a high-speed railway dedicated network from the base station, and determine, according to the notification information, that the UE is in the high-speed moving state; or directly obtain, from the base station, notification information indicating that the UE is in the high-speed moving state; or obtain a speed stage of the UE from the base station, and determine, when the speed stage satisfies a preset condition, that the UE is in the high-speed moving state.

Optionally, the apparatus further includes a sending unit configured to send capability indication information to the base station before the obtaining unit 1101 obtains, from the base station, the notification information indicating that the UE is in a high-speed moving state, where the capability indication information is used to indicate that the UE supports time-frequency synchronization processing in a high-speed scenario and demodulation processing in the high-speed scenario.

Figure 12:
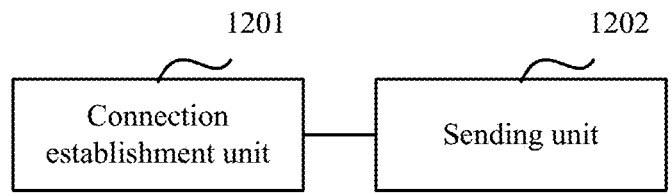
FIG. 12 is a structural diagram of a data demodulation apparatus according to Embodiment 7 of the present disclosure.

FIG. 12 is a structural diagram of a data demodulation apparatus according to Embodiment 7 of the present disclosure. The apparatus is disposed in a base station. In a high-speed scenario, a dedicated network is used for coverage, referring to FIG. 12, the apparatus includes a connection establishment unit 1201 configured to establish a connection to UE; and a sending unit 1202 configured to send, to the UE, notification information that the UE is in a high-speed moving state, so that the UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

Optionally, the base station further includes the speed estimation unit is configured to estimate a moving speed of the UE before the sending unit 1202 sends, to the UE, notification information that the UE is in a high-speed moving state.

The sending unit 1202 is configured to send, to the UE when the moving speed estimated by the speed estimation unit is greater than a speed threshold, the notification information that the UE is in a high-speed moving state.

Optionally, the sending unit 1202 is configured to send an RRC connection reconfiguration message to the UE, where a first indicator bit in the RRC connection reconfiguration message is used to indicate that the UE is in the high-speed moving state; or send a system message to the UE, where a second indicator bit in the system message is used to indicate that the UE is in the high-speed moving state; or send a system message to the UE, where the system message carries a cell identifier of a high-speed railway dedicated network cell.

Optionally, the sending unit 1202 is configured to send, to the UE, notification information indicating that the UE is in a high-speed railway dedicated network, so that the UE determines, according to the notification information, that the UE is in the high-speed moving state; or directly send, to the UE, notification information indicating that the UE is in the high-speed moving state; or send a speed stage of the UE to the UE, so that the UE determines, when the speed stage satisfies a preset condition, that the UE is in the high-speed moving state.

Optionally, the base station further includes a receiving unit configured to receive capability indication information sent by the UE before the sending unit 1202 sends, to the UE, the notification information that the UE is in a high-speed moving state, where the capability indication information is used to indicate that the UE supports time-frequency synchronization processing in a high-speed scenario and demodulation processing in the high-speed scenario.

Figure 13:
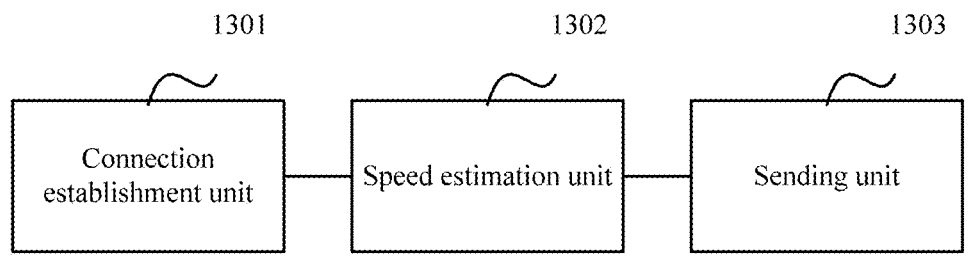
FIG. 13 is a structural diagram of a data demodulation apparatus according to Embodiment 8 of the present disclosure.

FIG. 13 is a structural diagram of a data demodulation apparatus according to Embodiment 8 of the present disclosure. The apparatus is disposed in a base station. In a case that a high-speed scenario is covered by a public network, referring to FIG. 13, the apparatus includes a connection establishment unit 1301 configured to establish a connection to UE; a speed estimation unit 1302 configured to estimate a moving speed of the UE; and a sending unit 1303 configured to, when the moving speed estimated by the speed estimation unit 1302 is greater than a speed threshold, send, to the UE, notification information that the UE is in a high-speed moving state, so that the UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

Preferably, the sending unit 1303 is configured to send an RRC connection reconfiguration message to the UE, where a first indicator bit in the RRC connection reconfiguration message is used to indicate that the UE is in the high-speed moving state; or send a system message to the UE, where a second indicator bit in the system message is used to indicate that the UE is in the high-speed moving state.

Optionally, the sending unit 1303 is configured to send a speed stage of the UE to the UE, so that the UE determines, when the speed stage satisfies a preset condition, that the UE is in the high-speed moving state.

Optionally, the sending unit 1303 is configured to send a cell identifier list of a high-speed railway dedicated network cell to the UE, so that the UE determines that the UE is in the high-speed moving state when a cell identifier of a cell in which the UE is currently located exists in the cell identifier list.

Optionally, the apparatus further includes a receiving unit configured to receive capability indication information sent by the UE before the sending unit 1303 sends, to the UE, the notification information that the UE is in a high-speed moving state, where the capability indication information is used to indicate that the UE supports time-frequency synchronization processing in a high-speed scenario and demodulation processing in the high-speed scenario.

Figure 14:
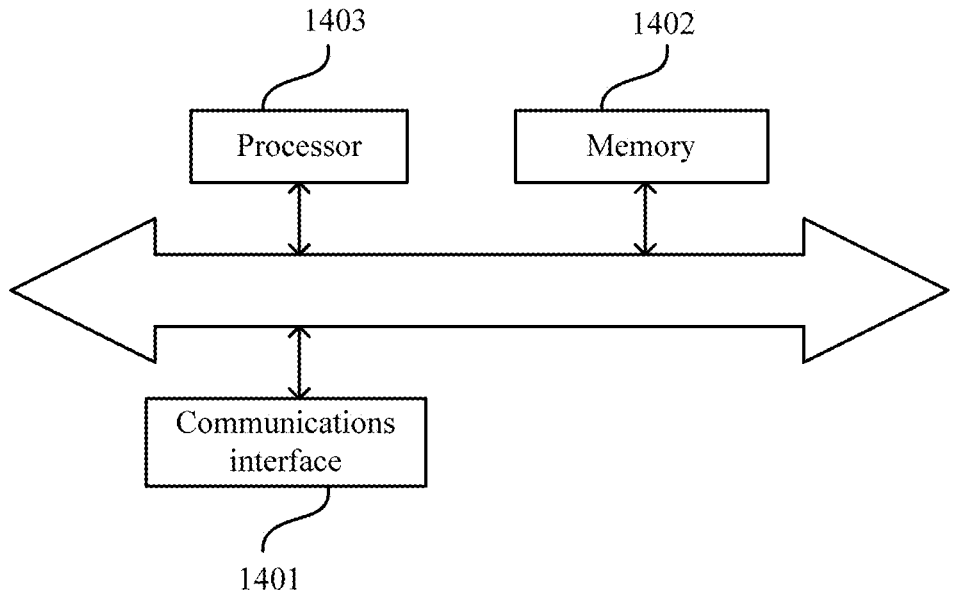
FIG. 14 is a structural diagram of UE according to Embodiment 9 of the present disclosure.

FIG. 14 is a structural diagram of UE according to Embodiment 9 of the present disclosure. Referring to FIG. 14, the UE is configured to execute the data demodulation method according to this embodiment of the present disclosure, and the UE includes a communications interface 1401; a memory 1402; a processor 1403; and an application program physically stored in the memory 1402, where the application program includes an instruction that may be used to enable the processor 1403 and the UE to execute the following process: obtaining notification information indicating that the UE is in a high-speed moving state; performing time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performing demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

Preferably, the instruction that is included in the application program and that may be used to enable the processor

1403 and the UE to execute the obtaining notification information indicating that the UE is in a high-speed moving state is: obtaining an RRC connection reconfiguration message, where a first indicator bit in the RRC connection reconfiguration message is used to indicate that the UE is in the high-speed moving state; or obtaining a system message, where a second indicator bit in the system message is used to indicate that the UE is in the high-speed moving state.

Figure 15:
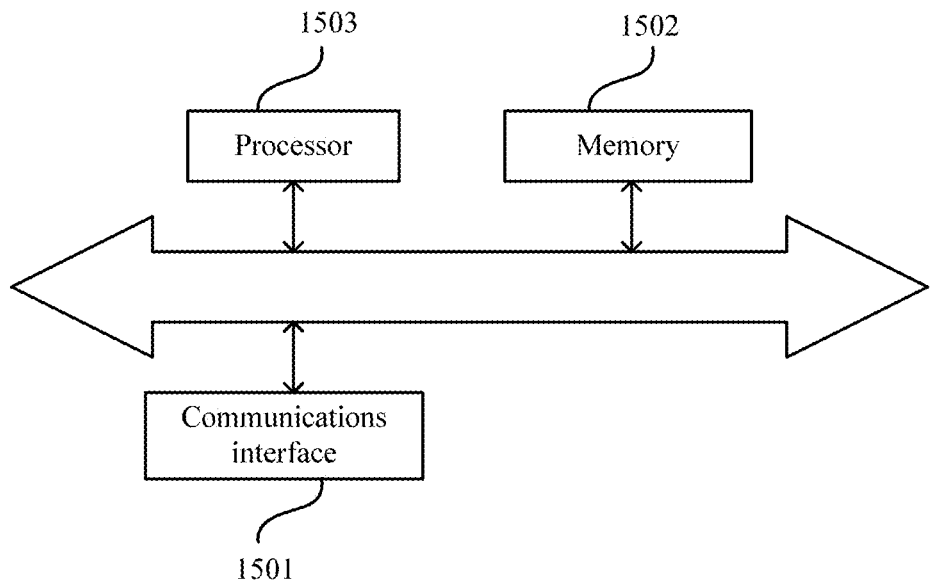
FIG. 15 is a structural diagram of a base station according to Embodiment 10 of the present disclosure.

FIG. 15 is a structural diagram of a base station according to Embodiment 10 of the present disclosure. Referring to FIG. 15, the base station is configured to execute the data demodulation method according to this embodiment of the present disclosure, and the base station includes a communications interface 1501; a memory 1502; a processor 1503; and an application program physically stored in the memory 1502, where the application program includes an instruction that may be used to enable the processor 1503 and the base station to execute the following process: establishing a connection to UE; and sending, to the UE, notification information that the UE is in a high-speed moving state, so that the UE performs time-frequency synchronization processing on first downlink data according to the notification information to obtain second downlink data, where an adjustment frequency in the time-frequency synchronization processing is greater than an adjustment frequency that is at a time when the UE is in a non-high-speed moving state, and an adjustment coefficient used for loop filtering in the time-frequency synchronization processing is greater than an adjustment coefficient that is at the time when the UE is in the non-high-speed moving state; and performs demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE is in the non-high-speed moving state for a channel estimation.

Preferably, the application program further includes an instruction that may be used to enable the processor 1503 and the base station to execute the following process: estimating a moving speed of the UE before the sending, to the UE, notification information that the UE is in the high-speed moving state; and performing, when the moving speed is greater than a speed threshold, the step of sending, to the UE, notification information that the UE is in a high-speed moving state.

Preferably, the instruction that is included in the application program and that may be used to enable the processor 1503 and the base station to execute the sending, to the UE, notification information that the UE is in a high-speed moving state is: sending an RRC connection reconfiguration message to the UE, where a first indicator bit in the RRC connection reconfiguration message is used to indicate that the UE is in the high-speed moving state; or sending a system message to the UE, where a second indicator bit in the system message is used to indicate that the UE is in the high-speed moving state.

Figure 16:
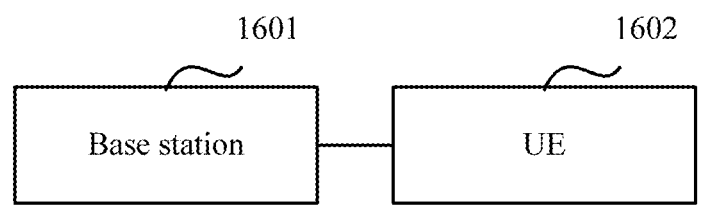
FIG. 16 is a structural diagram of a data demodulation system according to Embodiment 11 of the present disclosure.

FIG. 16 is a structural diagram of a data demodulation system according to Embodiment 11 of the present disclosure. Referring to FIG. 16, the system is configured to execute the data demodulation method according to this embodiment of the present disclosure, and the system includes a base station 1601 configured to establish a connection to UE 1602, and send, to the UE 1602, notification information that the UE 1602 is in a high-speed moving state; and the UE 1602 configured to obtain notification information indicating that the UE 1602 is in a high-speed moving state; perform time-frequency synchronization processing on first downlink data according to the notification information to obtain second downlink data, where an adjustment frequency in the time-frequency synchronization processing is greater than an adjustment frequency that is at a time when the UE 1602 is in a non-high-speed moving state, and an adjustment coefficient used for loop filtering in the time-frequency synchronization processing is greater than an adjustment coefficient that is at a time when the UE 1602 is in the non-high-speed moving state; and perform demodulation processing on the second downlink data to obtain third downlink data, where in the demodulation processing, inter-TTIs filtering for a channel estimation is not performed, or a filtering coefficient as a weight of a current TTI for a channel estimation is greater than a filtering coefficient as a weight of a TTI that is at the time when the UE 1602 is in the non-high-speed moving state for a channel estimation.

Preferably, before the sending, to the UE 1602, notification information that the UE 1602 is in a high-speed moving state, the base station 1601 is further configured to estimate a moving speed of the UE 1602; and perform, when the moving speed is greater than a speed threshold, the step of sending, to the UE 1602, notification information that the UE 1602 is in a high-speed moving state.

Preferably, the sending, to the UE 1602, notification information that the UE 1602 is in a high-speed moving state further includes sending an RRC connection reconfiguration message to the UE 1602, where a first indicator bit in the RRC connection reconfiguration message is used to indicate that the UE 1602 is in the high-speed moving state; or sending a system message to the UE 1602, where a second indicator bit in the system message is used to indicate that the UE 1602 is in the high-speed moving state.

Preferably, the obtaining notification information indicating that the UE 1602 is in a high-speed moving state includes obtaining an RRC connection reconfiguration message, where a first indicator bit in the RRC connection reconfiguration message is used to indicate that the UE 1602 is in the high-speed moving state; or obtaining a system message, where a second indicator bit in the system message is used to indicate that the UE 1602 is in the high-speed moving state.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, read-only memory, a flash memory, a hard disk, a solid state drive, a magnetic tape, a floppy disk, an optical disc, or any combination thereof.

The foregoing descriptions are merely examples of embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data demodulation method performed by a terminal moving at a high speed, the method comprising:
   performing time-frequency synchronization processing on first downlink data to obtain second downlink data, an adjustment frequency in the time-frequency synchronization processing being greater than an adjustment frequency for a non-high-speed moving state, and an adjustment coefficient used for loop filtering in the time-frequency synchronization processing being greater than an adjustment coefficient for the non-high-speed moving state; and
   performing demodulation processing on the second downlink data to obtain third downlink data, wherein the demodulation processing is performed using a first filtering coefficient as a weight of a residual frequency shift of a current inter-transmission time interval (TTI) for a channel estimation in a high speed moving state, and wherein the first filtering coefficient is greater than a second filtering coefficient used as a weight of a residual frequency shift of a current TTI for a channel estimation in the non-high-speed moving state.

2. The method of claim 1, further comprising receiving from a network device information indicating the terminal is in the high speed moving state.

3. The method of claim 1, further comprising receiving from a network device information indicating a high speed railway dedicated network cell.

4. The method of claim 1, further comprising sending to a network device information indicating the terminal supports high speed moving scenario.

5. The method of claim 1, wherein the demodulation processing is further performed using a third filtering coefficient as a weight of a historical frequency shift of the current TTI for the channel estimation in the high speed moving state, and wherein the third filtering coefficient is less than a fourth filtering coefficient used as a weight of a historical frequency shift of the current TTI for the channel estimation in the non-high-speed moving state.

6. A data demodulation method performed by a network device moving at a high speed, the method comprising:
   receiving, from a terminal, information indicating that the terminal supports a high speed moving scenario; and
   causing, by sending to the terminal information indicating the terminal is in a high speed moving state, the terminal to:
      perform time-frequency synchronization processing using an adjustment frequency and an adjustment coefficient for the high speed moving state, and
      perform demodulation processing using a first filtering coefficient as a weight of a residual frequency shift of a current inter-transmission time interval (TTI) for a channel estimation in the high speed moving state, wherein the first filtering coefficient is greater than a second filtering coefficient used as a weight of a residual frequency shift of a current TTI for a channel estimation in a non-high speed moving state.

7. The method of claim 6, further comprising estimating a moving speed of the terminal.

8. A terminal, comprising:
   a communications interface; and
   a processor coupled to the communications interface and configured to:
      perform time-frequency synchronization processing on first downlink data to obtain second downlink data, wherein an adjustment frequency in the time-frequency synchronization processing is greater than an adjustment frequency for a non-high-speed moving state, and wherein an adjustment coefficient used for loop filtering in the time-frequency synchronization processing is greater than an adjustment coefficient for the non-high-speed moving state; and
      perform demodulation processing on the second downlink data to obtain third downlink data, wherein the demodulation processing is performed using a first filtering coefficient as a weight of a residual frequency shift of a current inter-transmission time interval (TTI) for a channel estimation in a high speed moving state, and wherein the first filtering coefficient is greater than a second filtering coefficient used as a weight of a residual frequency shift of a current TTI for a channel estimation in the non-high-speed moving state.

9. The terminal of claim 8, wherein the communications interface is configured to receive, from a network device, information indicating the terminal is in the high speed moving state.

10. The terminal of claim 8, wherein the communications interface is configured to receive, from a network device, information indicating a high speed railway dedicated network cell.

11. The terminal of claim 8, wherein the communications interface is configured to send, to a network device, information indicating the terminal supports high speed moving scenario.

12. The terminal of claim 8, wherein the demodulation processing is further performed using a third filtering coefficient as a weight of a historical frequency shift of the current TTI for the channel estimation in the high speed moving state, and wherein the third filtering coefficient is less than a fourth filtering coefficient used as a weight of a historical frequency shift of the current TTI for the channel estimation in the non-high-speed moving state.

13. A network device, comprising:
   a communications interface; and
   a processor coupled to the communications interface and configured to:
      receive, through the communications interface, from a terminal information indicating the terminal supports high speed moving scenario; and
      cause, by sending, through the communications interface to the terminal information indicating the terminal is in a high speed moving state, the terminal to:
         perform time-frequency synchronization processing using an adjustment frequency and an adjustment coefficient for the high speed moving state, and
         perform demodulation processing using a first filtering coefficient as a weight of a residual frequency shift of a current inter-transmission time interval (TTI) for a channel estimation in the high speed moving state, wherein the first filtering coefficient is greater than a second filtering coefficient used as a weight of a residual frequency shift of a current TTI for a channel estimation in a non-high speed moving state.

14. The network device of claim 13, wherein the processor is further configured to estimate a moving speed of the terminal.

* * * * *

UNITED STATES PATENT AND TRADEMARK OFFICE
CERTIFICATE OF CORRECTION

PATENT NO. : 10,404,516 B2
APPLICATION NO. : 16/015964
DATED : September 3, 2019
INVENTOR(S) : Qiming Li et al.

Page 1 of 1

It is certified that error appears in the above-identified patent and that said Letters Patent is hereby corrected as shown below:

In the Claims

Claim 5, Column 23, Line 45: "charnel" should read "channel"

Signed and Sealed this
Fifteenth Day of October, 2019

Andrei Iancu
*Director of the United States Patent and Trademark Office*